(12) United States Patent
Allore et al.

(10) Patent No.: US 9,407,740 B2
(45) Date of Patent: Aug. 2, 2016

(54) MOBILE ELECTRONIC DEVICE CIRCUIT BOARD WITH CUTOUT

(71) Applicant: Google Technology Holdings LLC, Mountain View, CA (US)

(72) Inventors: Joseph L Allore, Mundelein, IL (US); Timothy J Sutherland, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 48 days.

(21) Appl. No.: 14/335,094

(22) Filed: Jul. 18, 2014

(65) Prior Publication Data

US 2016/0021226 A1 Jan. 21, 2016

(51) Int. Cl.
*H04M 1/00* (2006.01)
*H04M 1/02* (2006.01)

(52) U.S. Cl.
CPC .......... *H04M 1/0262* (2013.01); *H04M 1/0277* (2013.01); *H04M 1/026* (2013.01)

(58) Field of Classification Search
None
See application file for complete search history.

(56) References Cited

U.S. PATENT DOCUMENTS

| | | | | |
|---|---|---|---|---|
| 6,565,380 B1 * | 5/2003 | Park | ............... | H01R 13/2442 439/500 |
| 7,586,753 B2 * | 9/2009 | Lu | ............... | H04M 1/0277 174/520 |
| 8,253,632 B2 * | 8/2012 | Kurashima | ............... | H01Q 1/36 343/700 MS |
| 2005/0282593 A1 * | 12/2005 | Spence | ............... | H04M 1/0214 455/575.3 |
| 2007/0265028 A1 * | 11/2007 | Jorgensen | ............... | H04M 1/0262 455/550.1 |
| 2009/0086447 A1 * | 4/2009 | Sugimoto | ............... | H05K 1/182 361/752 |
| 2009/0247246 A1 * | 10/2009 | Takita | ............... | H04M 1/0277 455/575.3 |
| 2010/0273537 A1 * | 10/2010 | Jiang | ............... | H04M 1/0262 455/575.1 |
| 2012/0282914 A1 * | 11/2012 | Alexander | ............... | H04M 1/72527 455/420 |
| 2013/0016050 A1 * | 1/2013 | Allore | ............... | H04M 1/185 345/173 |
| 2013/0036480 A1 * | 2/2013 | Anderson | ............... | H04L 63/0853 726/30 |
| 2013/0258563 A1 * | 10/2013 | Lai | ............... | H05K 5/065 361/679.01 |
| 2013/0308282 A1 * | 11/2013 | Shin | ............... | H05K 7/14 361/749 |
| 2014/0036539 A1 * | 2/2014 | Lee | ............... | G02B 6/0011 362/613 |
| 2014/0171159 A1 * | 6/2014 | Endo | ............... | H01Q 1/243 455/575.7 |
| 2014/0321033 A1 * | 10/2014 | Hallmark | ............... | H01M 2/0207 361/679.01 |
| 2015/0060506 A1 * | 3/2015 | Cameron | ............... | A45C 11/00 224/267 |

* cited by examiner

*Primary Examiner* — Dominic Rego
(74) *Attorney, Agent, or Firm* — Faegre Baker Daniels LLP

(57) ABSTRACT

A mobile electronic device is described. The mobile electronic device includes a circuit board and a battery. The circuit board has opposing first and second peripheral edges. The first peripheral edge has a first cutout and the second peripheral edge has a second cutout. The battery is located adjacent to the circuit board and has opposing first and second curved end portions. The first curved end portion extends at least partially through the first cutout. The second curved end portion extends at least partially through the second cutout.

20 Claims, 12 Drawing Sheets

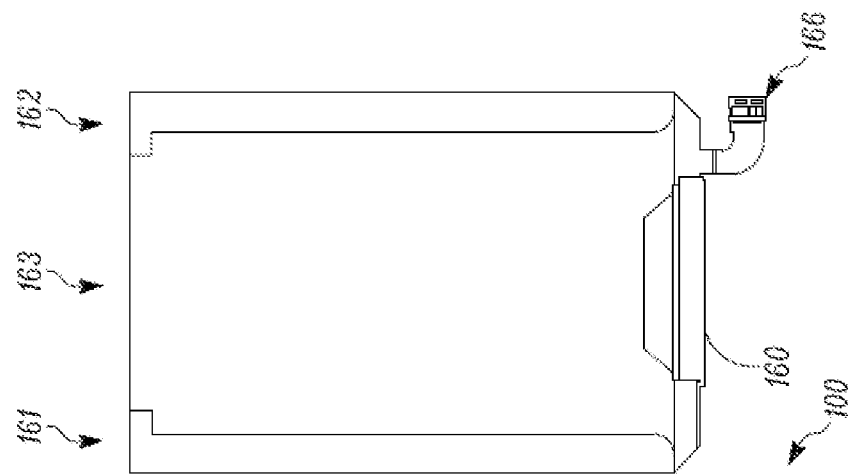
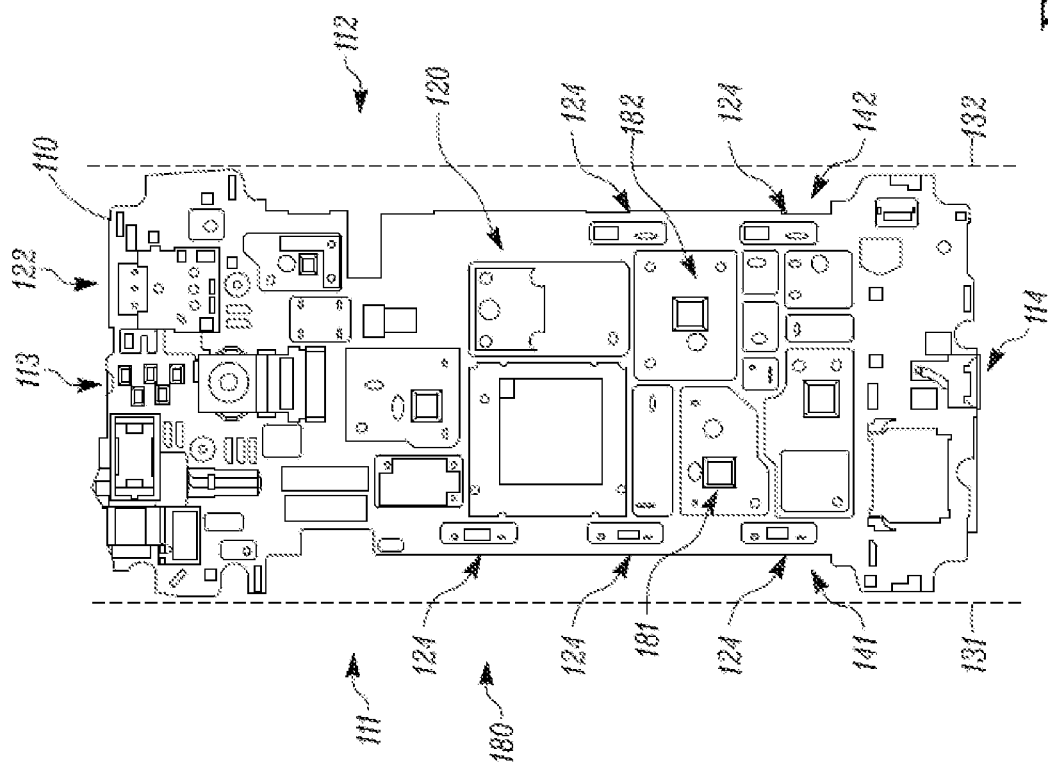
FIG. 1

MOBILE ELECTRONIC DEVICE CIRCUIT BOARD WITH CUTOUT

TECHNICAL FIELD

The present disclosure is related generally mobile electronic devices and, more particularly, to circuit boards for mobile electronic devices that provide a cutout for a battery.

BACKGROUND

Mobile electronic devices such as laptop computers, tablet computers, smartphones, and other devices often use rechargeable battery packs as a source of electrical power. The batteries are generally arranged in rectangular battery packs, however, recent advances in battery technologies allow for battery packs to be produced with a curved shape. Mobile electronic devices often have housings that are curved to be more ergonomic and comfortable for a user to hold with one hand. A battery pack with a curved shape may be incorporated into a curved housing more easily, allowing for further enhancement to the shape of the housing. However, other components within the housing (e.g., circuit boards and electronic components) cannot be readily produced with curved shapes and thus limit the design of the housing.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

FIG. 1 is a diagram illustrating an exploded view of a circuit board and battery of a mobile electronic device, according to an embodiment;

DETAILED DESCRIPTION

Figure 2:
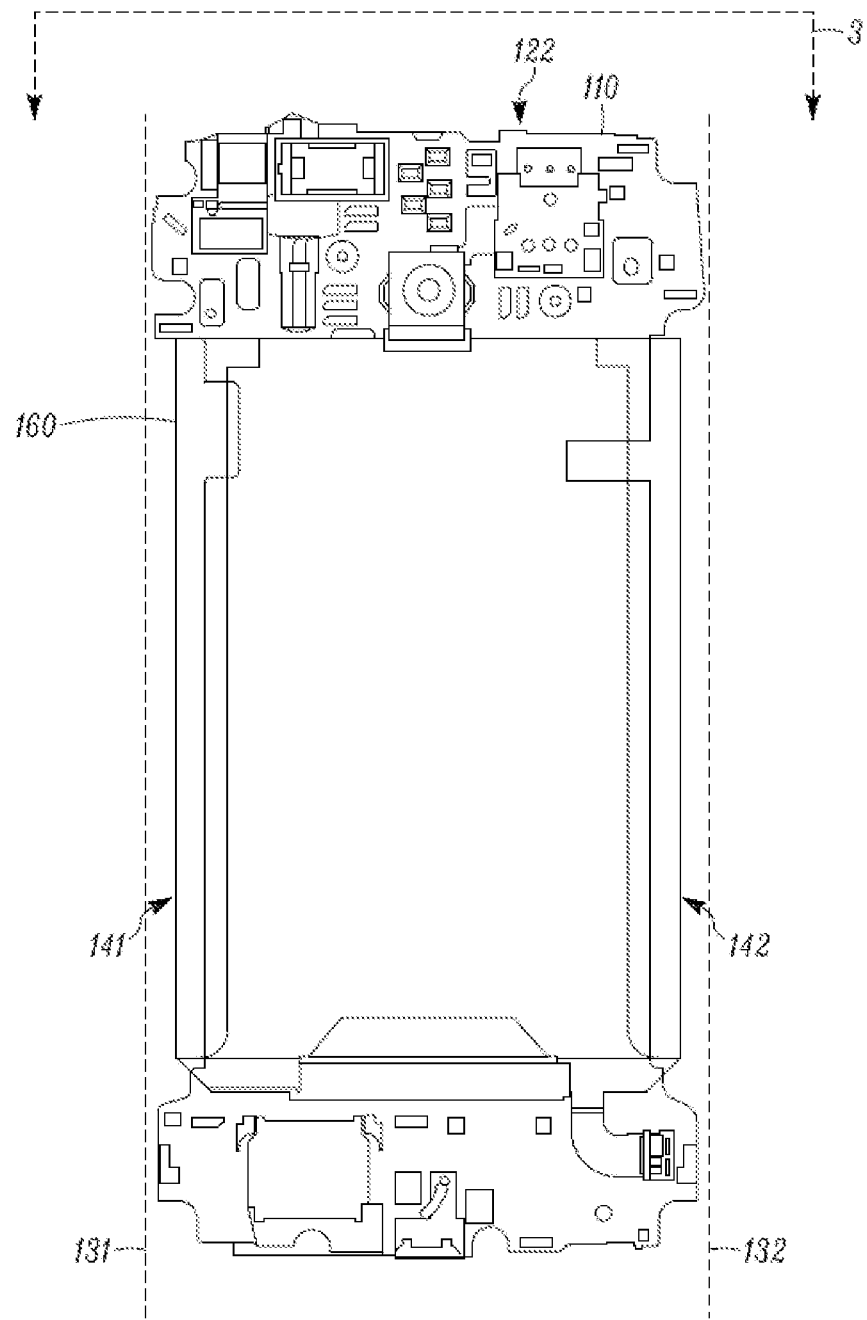
FIG. 2 is a diagram illustrating the circuit board and the battery of FIG. 1 in an assembled configuration, according to an embodiment.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Mobile electronic devices may be designed with curved housings or other ergonomic shapes that take advantage of curved battery packs. However, a curved battery pack often leaves unused space inside the curved housing due to the flat surfaces or rectangular shapes of other components within the curved housing. According to various embodiments described herein, a circuit board of a mobile electronic device has cutouts for accommodating a curved battery, allowing for a more efficient placement of the battery in proximity to the circuit board. In some embodiments, a curved end portion of the battery extends at least partially through the cutouts to improve space utilization within the housing and allow for a larger battery. The circuit board is supported by the housing predominantly along upper and lower end portions, leaving the cutouts substantially open to receive the battery. Electronic components on the circuit board are located in a stepped configuration that substantially conforms to a shape of the curved battery such that components with a larger height are closer to a center of the circuit board. The electronic components may also be staggered to promote stiffness of the circuit board to compensate for reduced stiffness due to the cutouts.

The present disclosure describes mobile electronic devices that utilize curved batteries. According to various embodiments, a mobile electronic device has a circuit board and a battery. The circuit board has opposing first and second peripheral edges. The first peripheral edge has a first cutout and the second peripheral edge has a second cutout. The battery is located adjacent to the circuit board and has opposing first and second curved end portions. The first curved end portion extends at least partially through the first cutout. The second curved end portion extends at least partially through the second cutout.

According to other embodiments, a mobile electronic device includes a rear housing, a front housing, a circuit board, and a curved battery. The rear housing has a reservoir. The front housing is connected with the rear housing. The circuit board is located between the front housing and the rear housing. The circuit board has an upper end portion, a center portion, and a lower end portion. The center portion has a width narrower than a width of at least one of the upper or lower end portions. The curved battery is located at least partially within the reservoir and adjacent to the circuit board. The curved battery has opposing first and second peripheral ends that curve toward and extend at least partially through a plane of the circuit board along the center portion.

Figure 5A:
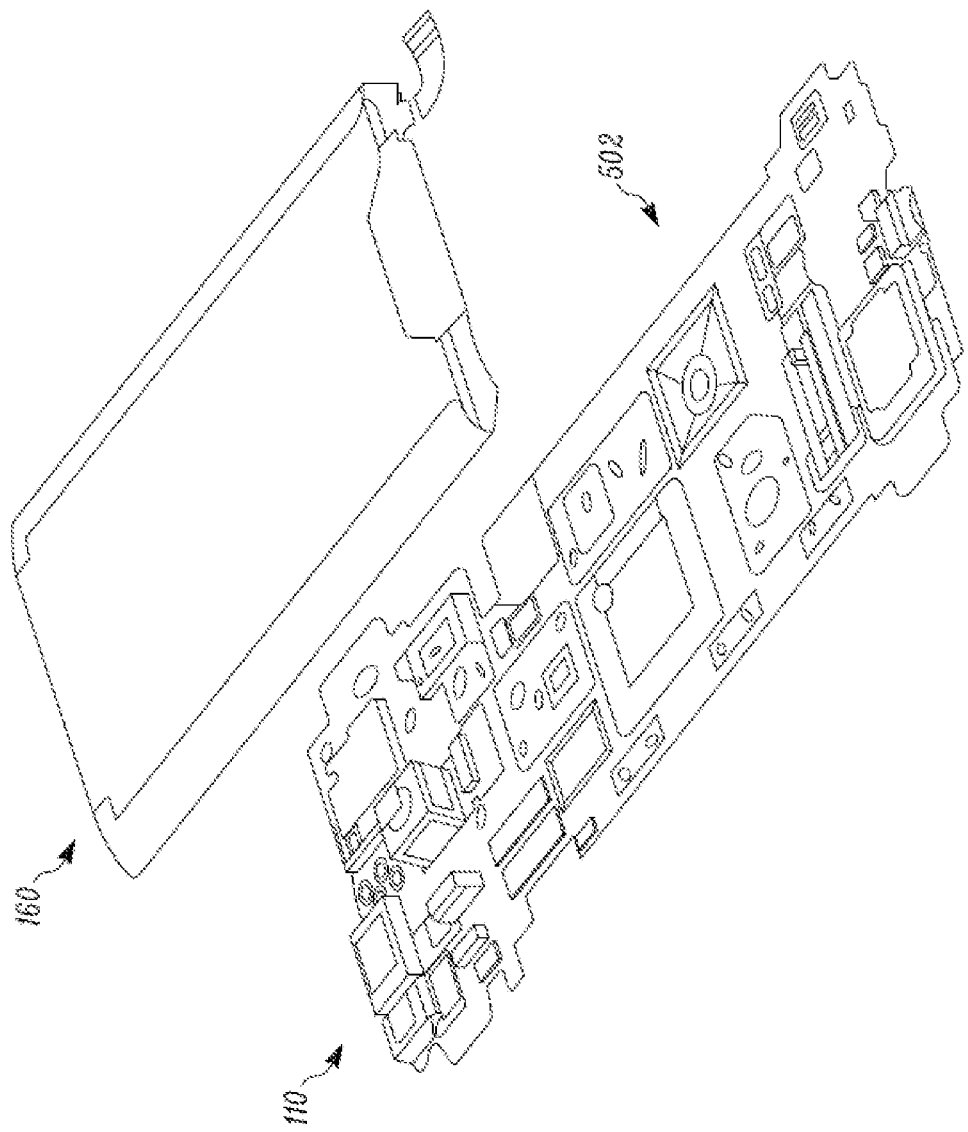
FIG. 5A and FIG. 5B are exploded and assembled views, respectively, of the circuit board and battery of FIG. 1.
Figure 5B:
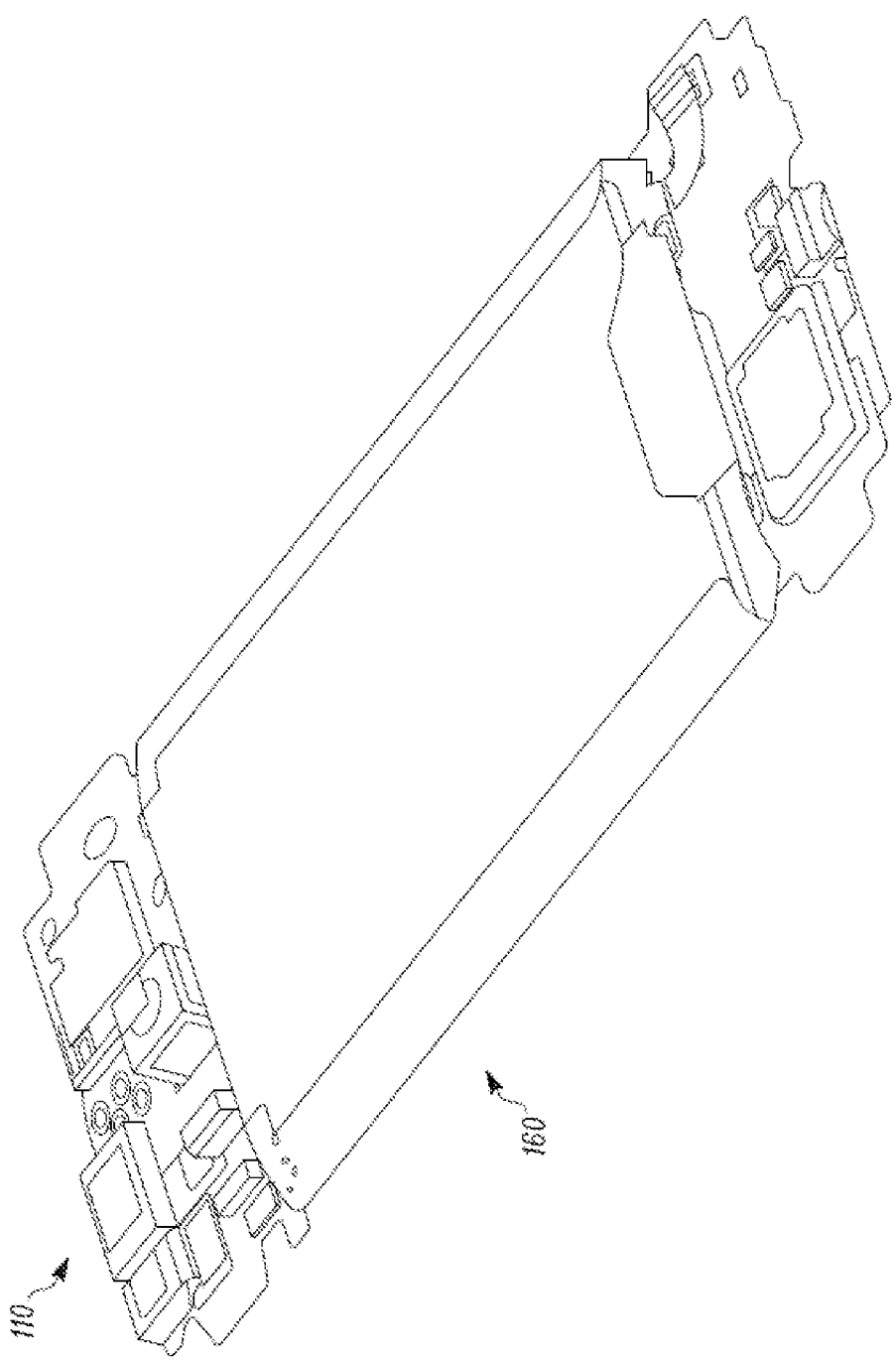
Figure 6:
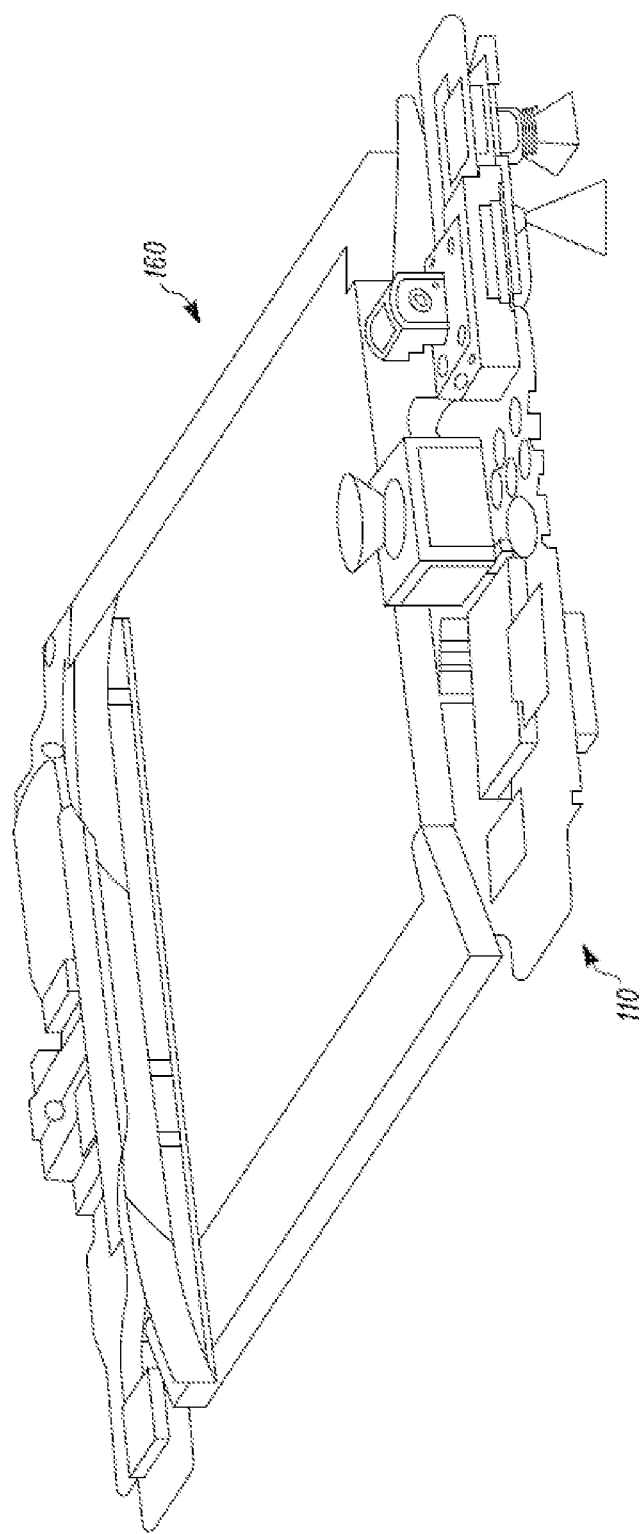
FIG. 6 is a perspective, assembled view of the circuit board and battery of FIG. 1.

Referring to FIG. 1, there is illustrated an exploded view of a circuit board 110 and a battery 160 for a mobile electronic device 100, according to an embodiment. Referring to FIG. 2, the circuit board 110 and the battery 160 are shown in an assembled configuration. Referring to FIGS. 5A and 5B, exploded and assembled views of the circuit board 110 and the battery 160 are shown. Referring to FIG. 6, a perspective view of the circuit board 110 assembled with the battery 160 is shown. The circuit board 110 has opposing first and second peripheral edges 111 and 112 located between an upper end portion 113 and a lower end portion 114. The circuit board 110 includes a plurality of electronic components 120 and one or more interface components 122. Examples of the electronic components 120 include processors, memory, surface mount components, sensors, speakers, vibration motors, radio transceivers, or other electronic components. Examples of the interface component 122 include a memory card slot (e.g., a Secure Digital card), subscriber identity module (SIM) slot, universal serial bus (USB) connector, audio connector, and the like. The circuit board 110 also includes a connector 126 for connection with a corresponding electrical connector 166 of the battery 160. In various embodiments, the battery 160 includes a lithium ion battery, lithium polymer battery, or a pack having a plurality of batteries that are electrically connected.

The first peripheral edge 111 has a first cutout 141 (e.g., between line 131 and the circuit board 110) and the second peripheral edge 112 has a second cutout 142 (e.g., between line 132 and the circuit board 110). The first and second cutouts 141 and 142 have a center portion 180 between each other. In this embodiment, the circuit board 110 is generally "I" shaped. Accordingly, the center portion 180 has a narrower width than the upper end portion 113 and the lower end portion 114. In other embodiments, the circuit board 110 is generally "T" shaped, such that the center portion 180 has a substantially same width as one of the upper end portion 113 or the lower end portion 114. In this case, the battery 160 is located closer to the end portion having the same width as the center portion 180. While the cutouts 141 and 142 as described herein are provided for accommodation of the battery 160, in other embodiments the cutouts 141 and 142 (or additional cutouts) are also formed for accommodating other electronic components of the mobile electronic device 110 (e.g., connectors, a display), for accommodating structural components (e.g., screws, fasteners, or portions of a housing), or other components, as will be apparent to those skilled in the art.

Referring to FIGS. 3A, 3B, 3C, and 3D, various cross sections of a mobile electronic device 100 are shown, illustrating a center line 334 of the mobile electronic device 100 and an edge line 332 corresponding to an outer edge of the second peripheral edge 112. The mobile electronic device 100 includes a frame (e.g., chassis, enclosure, or exoskeleton) to which components of the mobile electronic device 100 are attached. In the embodiment shown, the frame includes a front housing 310 (FIG. 3) and a rear housing 311 that are joined together to support the circuit board 110. The front housing 310 and rear housing 311 attach to each other via one or more of a snap-fit engagement, re-usable adhesive, screws, or a combination thereof, in various embodiments. The front housing 310 and rear housing 311 in one example comprise a plastic-based material. Examples of the plastic-based material include polycarbonate, polyethylene, polypropylene, polyvinyl chloride, polyoxymethylene, acrylonitrile butadiene styrene, or other injection-moldable plastics. The housing may optionally include an inlay or back panel 312 with a different material that provides an enhanced grip, a "soft feel" to the user, or desired aesthetics, such as a thermoplastic polyurethane material ("TPU"), leather, aluminum, titanium, Kevlar, carbon fiber, or other materials as will be apparent to those skilled in the art.

The front and rear housing 310 and 311, when connected with each other, support the circuit board 110 predominantly along the upper and lower end portions 113 and 114. This allows the circuit board 110 to be generally free from obstructions along the peripheral edges 111 and 112 where the battery 160 is located. While the battery 160 is shown generally centered along the center line 334, in other embodiments it may be placed at a location offset from the center line 334. In some embodiments, the cutouts 141 and 142 are formed asymmetrically for offset placement of the battery 160. For example, the cutout 141 may extend closer to the center line 334 than the cutout 142.

Figure 7A:
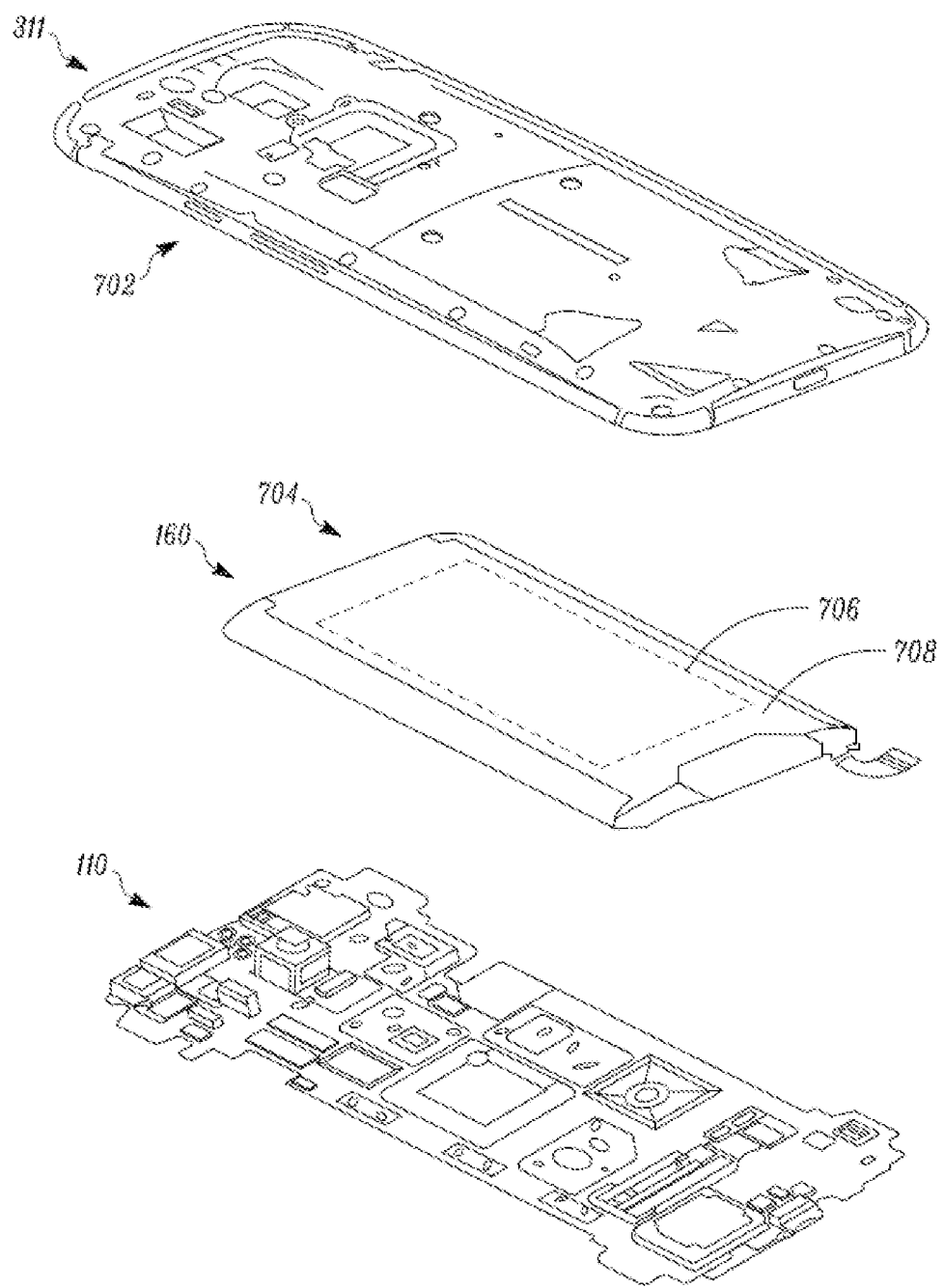
FIG. 7A and FIG. 7B are exploded and assembled views, respectively, of the circuit board and battery of FIG. 1, further illustrating a rear housing of a mobile electronic device.
Figure 7B:
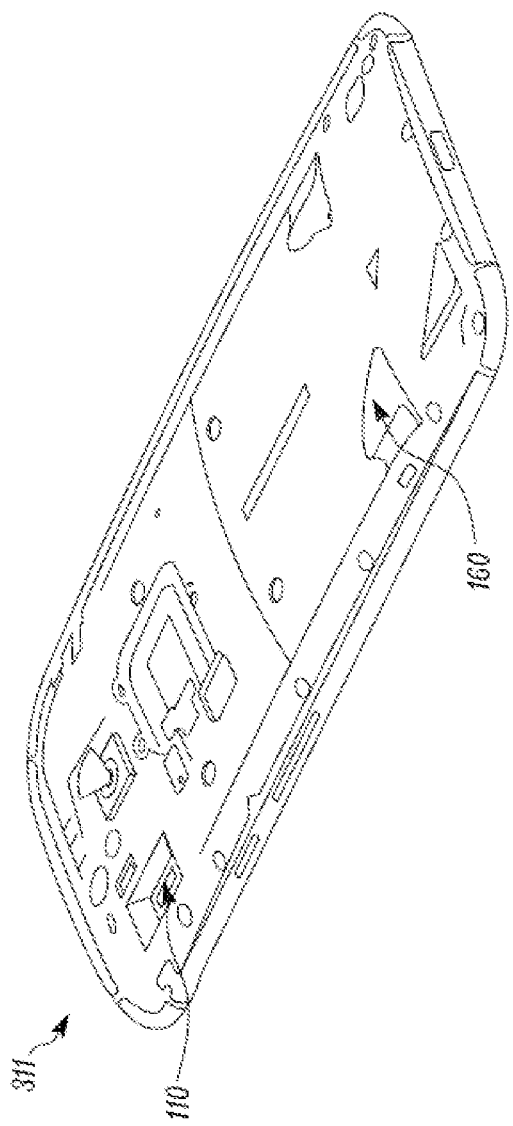
Figure 8A:
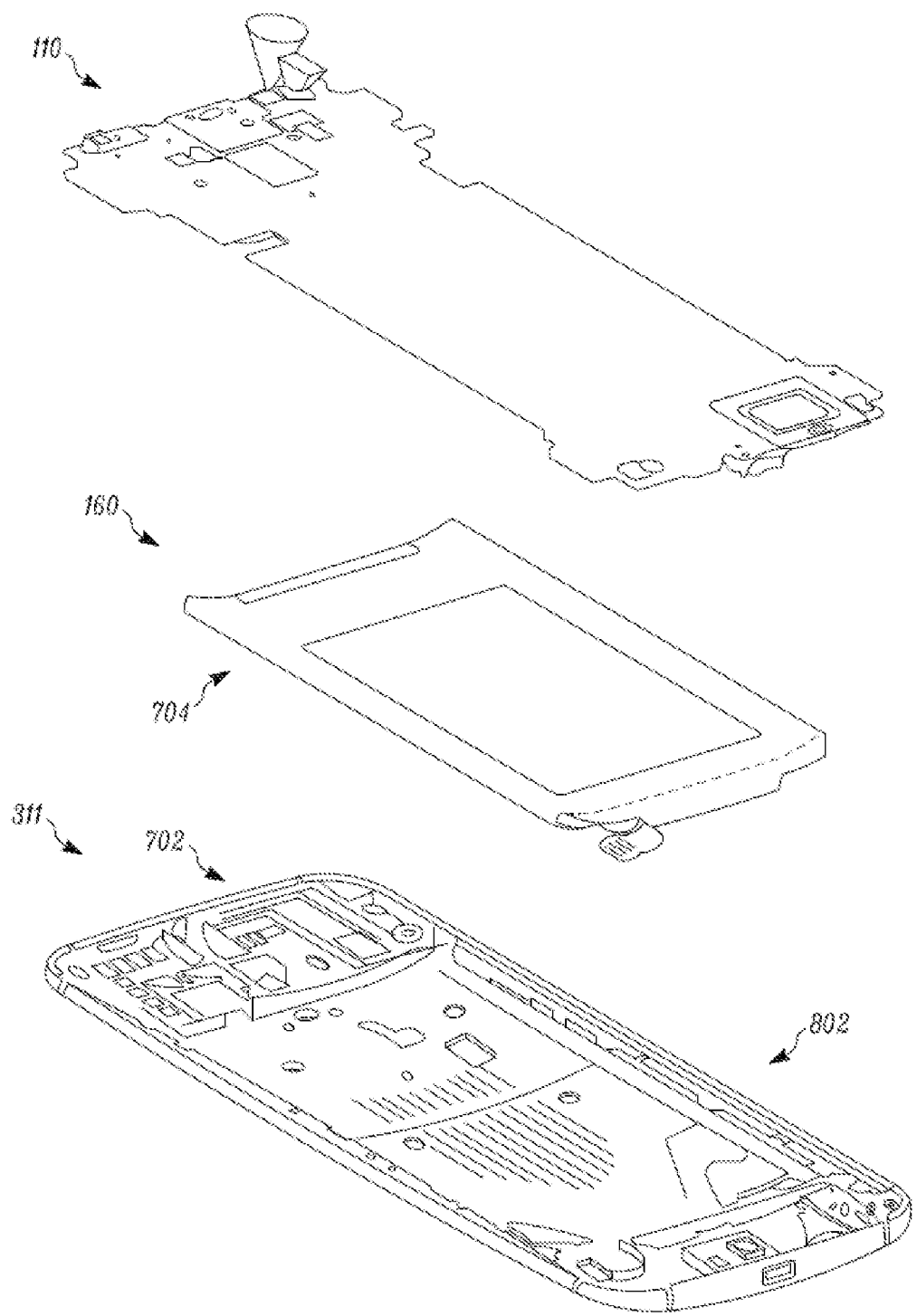
FIG. 8A and FIG. 8B are exploded and assembled views, respectively, of the circuit board, battery, and rear housing shown in FIG. 7A and FIG. 7B.
Figure 8B:
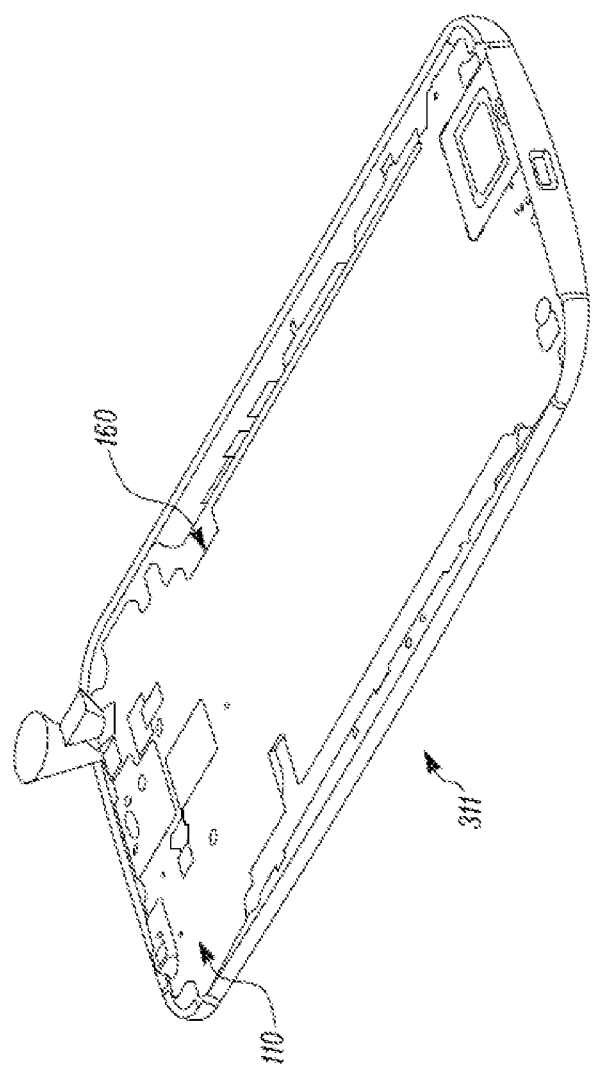

Referring to FIGS. 7A and 7B, exploded and assembled views of the circuit board 110, the battery 160, and the rear housing 311 are shown. Referring to FIGS. 8A and 8B, additional exploded and assembled views of the circuit board 110, the battery 160, and the rear housing 311 are shown. The rear housing 311 has a reservoir 702 that supports an outwardly facing surface 704 of the battery 160. The battery 160 is located at least partially within the reservoir 702 and adjacent to the circuit board 110. The battery 160 has opposing first and second curved end portions 161 and 162 to provide a generally curved, convex shape. In the embodiment shown in FIG. 1, the first and second curved end portions 161 and 162 have a same curved shape. In other embodiments, the first and second curved end portions 161 and 162 have different curved shapes. Various embodiments of the first and second curved end portions 161 and 162 have a constant radius of curvature (e.g., approximately 50 millimeters), compound radius of curvature, Bezier curvature, or other curved shape. In some embodiments, the battery 160 also includes a center portion 163 between the first and second curved end portions 161 and 162. In various embodiments, the center portion 163 has a flat shape as compared to the curved end portions 161 and 162. In other embodiments, the center portion 163 is also curved, but with a different curvature from the curved end portions 161 and 162. In still other embodiments, the battery 160 has a stepped or tiered configuration in addition to the curved end portions 161 and 162.

Figure 3:
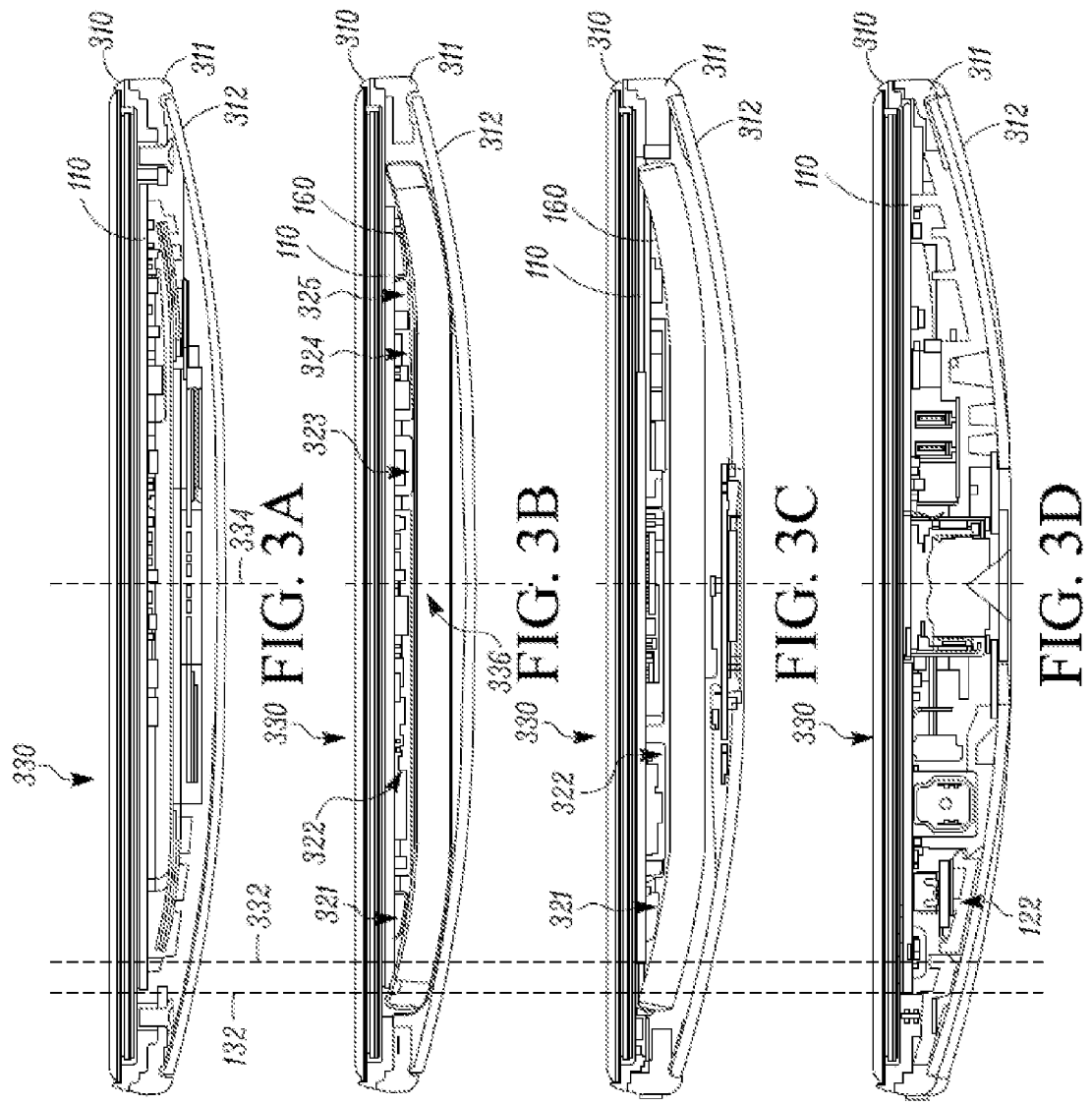
FIG. 3A, FIG. 3B, FIG. 3C, and FIG. 3D are diagrams illustrating various cross sections of a mobile electronic device that includes the circuit board and battery of FIG. 1, according to an embodiment.
Figure 4:
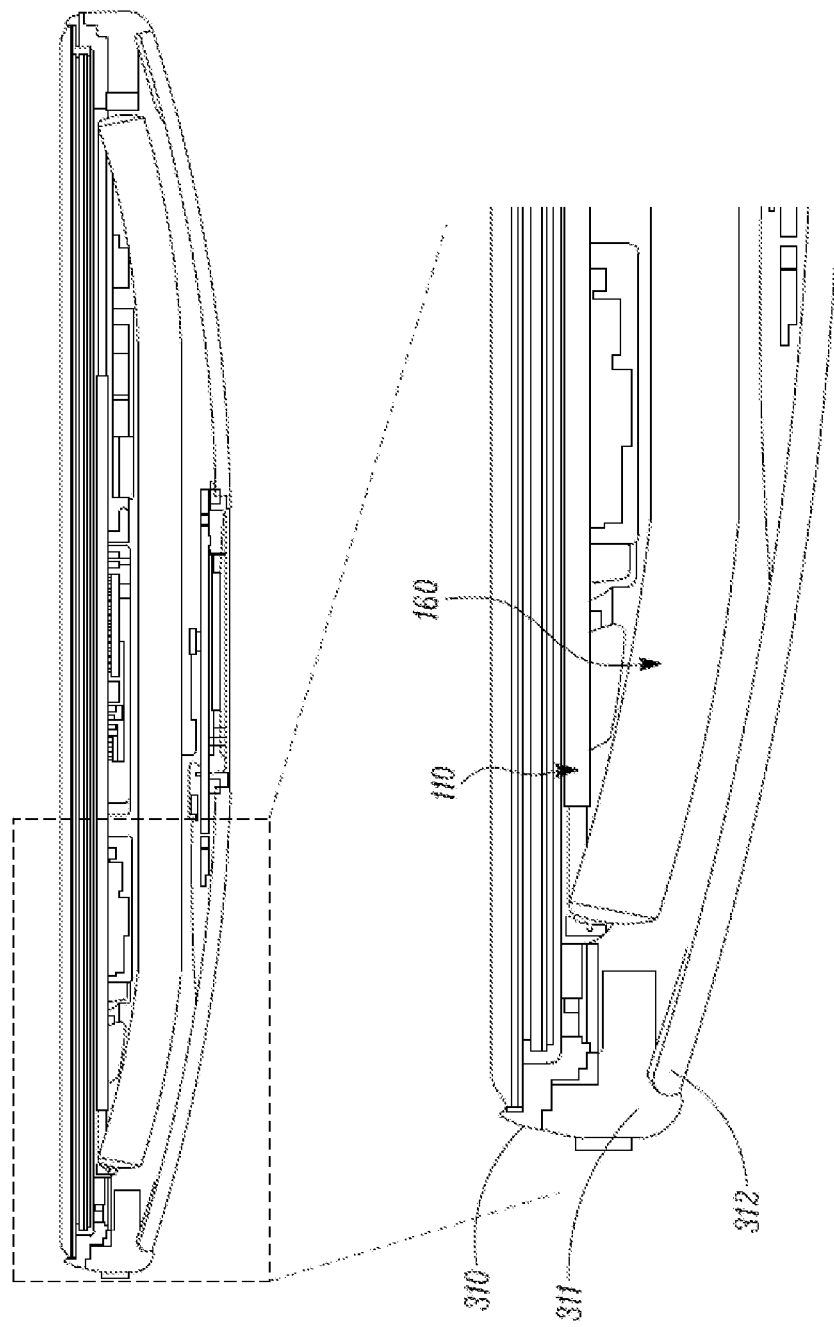
FIG. 4 is a diagram illustrating a partial cross-sectional view of the mobile electronic device of FIG. 3C.

When the battery 160 and circuit board 110 are assembled, the first curved end portion 161 extends at least partially through the first cutout 141 and the second curved end portion 162 extends at least partially through the second cutout 142. Accordingly, the battery 160 extends through a plane of the circuit board along the center portion 180 between the cutouts 141 and 142. Referring to FIG. 4, a partial cross-sectional view of the mobile electronic device 100 of FIG. 3C is shown, illustrating the battery 160 extending through the plane of the circuit board 110. The curved end portions 161 and 162 allow the front housing 310 and rear housing 311 to be formed with a curved and thus more ergonomic shape that can be comfortably held in a user's hand.

In various embodiments, the rear housing 311 and reservoir 702 have a shape that substantially conforms to the battery 160 (e.g., to the shape of the first and second curved end portions 161 and 162). In other embodiments, the rear housing 311 and reservoir 702 are shaped with a desired curvature for ergonomics and the battery 160 is suitably flexible to conform to the reservoir 702 upon assembly. Accordingly, the rear housing 311 and reservoir 702 provide structural support to the battery 160 and protect the battery 160 from undesired flexing. In some embodiments, the reservoir 702 has a swell gap 336 to allow for expansion or contraction of the battery 160. The rear housing 311 further includes an antenna structure 802 along an outer edge located adjacent to the first curved end portion 161 of the battery 160. The antenna structure 802 provides space for an antenna farm or other components to be located around a periphery of the mobile electronic device 100, further from the electronic components 120 and thus reducing electromagnetic interference. In some embodiments, one or more antennas (not shown) are integrated with the front housing 310 or the rear housing 311, for example, using a laser direct structuring process.

The plurality of electronic components 120 includes electronic components 321, 322, 323, 324, and 325. As shown in FIG. 3, various electronic components have different sizes and heights from a surface of the circuit board 110. For example, electronic component 322 has a larger height from a surface of the circuit board 110 than the electronic component 321. The electronic components 321, 322, 323, 324, and 325 are located on the circuit board based on a stepped configuration that substantially conforms to a shape of the first and second curved end portions 161 and 162. For example, electronic components with a larger height from the surface are located closer to the center line 334 of the circuit board 110 where there is more space between the battery 160 and the surface of the circuit board 110. In some embodiments, one or more of the electronic components 120 are covered by a component shield having a curved or tapered shape that substantially conforms to the battery 160 (e.g., to the curved end portions 161 or 162).

The mobile electronic device 100 includes a display 330, such as a touch screen display or other user interface component. While the display 330 is shown as a flat display, in other embodiments the display 330 is a curved touch screen display having a curved shape that substantially conforms to the curved shape of the rear housing 311. In this case, the display 330, the battery 160, the front housing 310, and the rear housing 311 have a similar curved shape that provides improved ergonomics for the mobile electronic device 100.

Various electronic components of the plurality of electronic components 120 are communicatively coupled by one or more traces 124 or surface-mount components of the circuit board 110. In some embodiments, the traces 124 are routed along outer edges of the circuit board 110, such as along the first peripheral edge 111 and adjacent to the first cutout 141 or along the second peripheral edge 112 and adjacent to the second cutout 142. The traces 124 may be on a surface of the circuit board 110 or embedded therein and thus have a shorter height than the electronic components 120. In some embodiments, the electronic components 120 are located closer to the center line 334 between the first and second cutouts 141 and 142 than some of the traces of the circuit board 110. Routing the traces along the outer edges near the first and second cutouts 141 and 142 reduces the height of the circuit board 110 near the curved end portions 161 and 162 that extend toward the circuit board 110, thus improving the utilization of space within the mobile electronic device 100.

In some embodiments, the electronic components 120 have staggered locations between the upper and lower end portions 113 and 114 that form an interlocking structure to increase stiffness of the circuit board 110. For example, a first electronic component 181 and a second electronic component 182 each have an edge that is substantially parallel to the width of the center portion 180. The edge of the electronic component 181 is offset from the edge of the electronic component 182 to increase stiffness of the circuit board 110. In other embodiments, shields or covers for one or more of the electronic components 120 have staggered locations to increase stiffness of the circuit board 110.

The interface components 122 and connector 126 may receive physical stresses, such as when a memory card is inserted or when the electrical connector 166 of the battery 160 is coupled with the connector 126. The interface components 122 and connector 126 are located on the upper end portion 113 and lower end portion 114 where the circuit board 110 is coupled with the front housing 310 and rear housing 311 to increase their stability and reduce flexing of the circuit board 110 during these physical stresses.

In some embodiments, the battery 160 is adhered to the rear housing 311 to maintain the battery 160 in an appropriate shape and protect the battery 160 from undesired flexing. In some examples, the battery 160 is adhered to the rear housing 311 with an adhesive over an entire surface of the battery 160. In other examples, the battery 160 is adhered to the rear housing 311 substantially along an outer periphery 708 of the battery 160 to allow for expansion or contraction of a center portion 706 of the battery 160. Expansion or contraction of the battery may occur due to charging or discharging of the battery 160, temperature changes, or other factors, as will be apparent to those skilled in the art.

Figure 9:
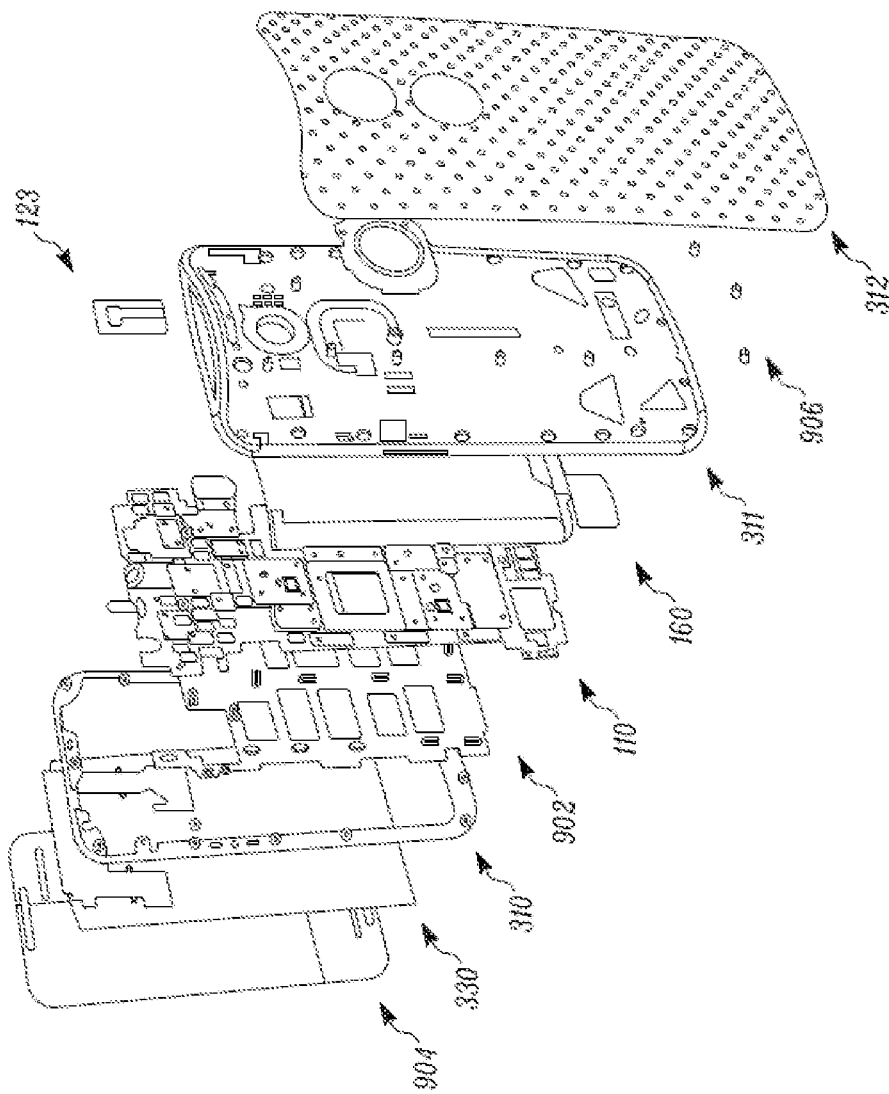
FIG. 9 is an exploded, perspective view of the mobile electronic device of FIG. 3.

Referring to FIG. 9, an exploded view of the mobile electronic device 100 is shown. The mobile electronic device 100 further includes component 902 and outer glass 904. The mobile electronic device 100 is assembled with a plurality of fasteners 906. As shown in FIG. 9, the interface component 122 includes a tray 123 for aiding insertion of a subscriber identity module.

It can be seen from the foregoing that a mobile electronic device having a curved battery is provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

The apparatus described herein may include a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

The disclosed embodiments may be described in terms of functional block components and various processing steps. Such functional blocks may be realized by any number of hardware and/or software components configured to perform the specified functions. For example, the disclosed embodiments may employ various integrated circuit components, e.g., memory elements, processing elements, logic elements, look-up tables, and the like, which may carry out a variety of functions under the control of one or more microprocessors or other control devices. Similarly, where the elements of the disclosed embodiments are implemented using software programming or software elements, the disclosed embodiments may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosed embodiments may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", "device", "controller", and "construction" are used broadly and are not limited to mechanical or physical embodiments, but may include software routines in conjunction with processors, etc.

No item or component is essential to the practice of the disclosed embodiments unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the disclosed embodiments (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the disclosed embodiments and does not pose a limitation on the scope of the disclosed embodiments unless otherwise claimed. Numerous modifications and adaptations will be readily apparent to those of ordinary skill in this art.

We claim:

1. A mobile electronic device, comprising:
   a circuit board having opposing first and second peripheral edges, the first peripheral edge having a first cutout and the second peripheral edge having a second cutout;
   a battery located adjacent to the circuit board and having opposing first and second curved end portions, the first curved end portion extending at least partially through the first cutout, the second curved end portion extending at least partially through the second cutout.

2. The mobile electronic device of claim 1, a battery facing side of the circuit board having first and second electronic components, the first electronic component having a larger height from a surface of the circuit board than the second electronic component;
   wherein the first and second electronic components are located on the circuit board based on a stepped configuration that substantially conforms to a shape of the first and second curved end portions of the battery.

3. The mobile electronic device of claim 1, a battery facing side of the circuit board having first and second electronic components that are communicatively coupled by a trace of the circuit board, the trace being routed along the first peripheral edge and adjacent to the first cutout;
   wherein the first and second electronic components are located closer to a center line between the first and second cutouts than the trace of the circuit board.

4. The mobile electronic device of claim 1, a battery facing side of the circuit board having an electronic component located adjacent to the first curved end portion, the electronic component being covered by a component shield having a shape that substantially conforms to the first curved end portion.

5. The mobile electronic device of claim 1, further comprising:
   a front housing and a rear housing that support the circuit board predominantly along upper and lower end portions of the circuit board, the first and second peripheral edges being located between the upper and lower end portions.

6. The mobile electronic device of claim 5, the circuit board having a plurality of electronic components with staggered locations between the upper and lower end portions to promote stiffness of the circuit board.

7. The mobile electronic device of claim 1, further comprising:
   a rear housing having a reservoir that supports an outwardly facing surface of the battery, the reservoir having a shape that substantially conforms to the first and second curved end portions.

8. The mobile electronic device of claim 7, wherein the battery is adhered to the rear housing.

9. The mobile electronic device of claim 8, wherein the battery is adhered to the rear housing substantially along an outer periphery of the battery to allow for expansion or contraction of a center portion of the battery.

10. The mobile electronic device of claim 7, the rear housing having an antenna structure along an outer edge located adjacent to the first curved end portion of the battery.

11. A mobile electronic device, comprising:
    a rear housing having a reservoir;
    a front housing connected with the rear housing;
    a circuit board located between the front housing and the rear housing, the circuit board having an upper end portion, a center portion, and a lower end portion, the center portion having a width narrower than a width of at least one of the upper or lower end portions;
    a curved battery located at least partially within the reservoir and adjacent to the circuit board, the curved battery having opposing first and second peripheral ends that curve toward and extend at least partially through a plane of the circuit board along the center portion.

12. The mobile electronic device of claim 11, the center portion having a width that is narrower than the width of both the upper end portion and the lower end portion.

13. The mobile electronic device of claim 12, the circuit board being predominantly supported, within the mobile electronic device, by the rear housing and the front housing at the upper end portion and the lower end portion.

14. The mobile electronic device of claim 13, the circuit board having a plurality of electronic components arranged between the upper and lower end portions;
    wherein each of a first and a second electronic component of the plurality of electronic components has an edge that is substantially parallel to the width of the center portion, the edge of the first electronic component being offset from the edge of the second electronic component.

15. The mobile electronic device of claim 14, wherein electronic components of the plurality of electronic components having a larger height from a surface of the circuit board are arranged closer to a center line of the center portion.

16. The mobile electronic device of claim 14, at least some of the plurality of electronic components being communicatively coupled by a plurality of traces that are routed along an outer region of the center portion.

17. The mobile electronic device of claim 14, the plurality of electronic components being arranged in an interlocking structure to increase stiffness of the circuit board.

18. The mobile electronic device of claim 11, the rear housing and reservoir having a curved shape that substantially conforms to the curved battery.

19. The mobile electronic device of claim 18, the curved battery being adhered to the reservoir along an outer periphery of the curved battery to allow for expansion or contraction of the battery within a swell gap of the reservoir.

20. The mobile electronic device of claim 18, further comprising a curved touch screen display having a curved shape that substantially conforms to the curved shape of the rear housing.

\* \* \* \* \*